United States Patent
Guyon (10) Patent No.: US 11,427,268 B2
(45) Date of Patent: Aug. 30, 2022

(54) AIR FLOW MANAGEMENT DEVICE AND VEHICLE COMPRISING SUCH A DEVICE

(71) Applicant: Flex-N-Gate France, Audincourt (FR)

(72) Inventor: Cyrille Guyon, Nommay (FR)

(73) Assignee: Flex-N-Gate France, Audincourt (FR)

( * ) Notice: Subject to any disclaimer, the term of this patent is extended or adjusted under 35 U.S.C. 154(b) by 18 days.

(21) Appl. No.: 17/003,907

(22) Filed: Aug. 26, 2020

(65) Prior Publication Data
US 2021/0061373 A1 Mar. 4, 2021

(30) Foreign Application Priority Data
Aug. 26, 2019 (FR) ...................... 19 09408

(51) Int. Cl.
*B62D 35/00* (2006.01)
*B62D 35/02* (2006.01)

(52) U.S. Cl.
CPC .......... *B62D 35/02* (2013.01); *B62D 35/005* (2013.01)

(58) Field of Classification Search
CPC .............................. B62D 35/005; B62D 35/02
USPC ........................................ 296/180.1, 180.3
See application file for complete search history.

(56) References Cited

U.S. PATENT DOCUMENTS

| 2013/0341110 A1* | 12/2013 | Butlin, Jr. | ............ B62D 35/005 180/68.1 |
| 2014/0110970 A1* | 4/2014 | Hoelzel | ................ B62D 35/005 296/180.5 |
| 2015/0084369 A1 | 3/2015 | Niemi et al. | |
| 2017/0355403 A1 | 12/2017 | Grebel | |
| 2018/0162459 A1* | 6/2018 | Abdoul Azizou | ..... B62D 37/02 |
| 2018/0229781 A1 | 8/2018 | Takato et al. | |
| 2019/0152543 A1 | 5/2019 | Shiga et al. | |
| 2020/0010128 A1 | 1/2020 | Herlem | |
| 2020/0094889 A1* | 3/2020 | Shiga | ..................... B62D 37/02 |
| 2020/0164934 A1* | 5/2020 | Shiga | ..................... B62D 37/02 |

FOREIGN PATENT DOCUMENTS

| DE | 3145258 A1 | 5/1983 | |
| DE | 19921480 A1 * | 11/2000 | ........... B62D 35/005 |
| FR | 3059978 A1 | 6/2018 | |
| FR | 3060521 A1 | 6/2018 | |
| JP | H03132482 A | 6/1991 | |

OTHER PUBLICATIONS

French Search Report corresponding to French Application No. FR 1909408, dated Jun. 11, 2020, 3 pages.

* cited by examiner

*Primary Examiner* — Jason S Daniels (74) *Attorney, Agent, or Firm* — Reising Ethington P.C.

(57) ABSTRACT

An air flow management device for a vehicle includes a support and at least one deflector wall supported by an actuating system mounted on the support and configured to move the deflector wall along a predefined trajectory relative to the support between a retracted position and a deployed position. The deflector wall is mounted to rotate relative to the support about an axis of rotation so as to be able to retract in case of contact of the deflector wall with an obstacle.

17 Claims, 8 Drawing Sheets

AIR FLOW MANAGEMENT DEVICE AND VEHICLE COMPRISING SUCH A DEVICE

This patent claims the benefit of document FR1909408 filed on Aug. 26, 2019, which is hereby incorporated by reference.

TECHNICAL FIELD

The present invention relates to an air flow management device for a vehicle. The present invention further relates to a vehicle comprising such a management device.

In particular, the present invention relates to an air flow management device for a vehicle, comprising a support and at least one deflector wall supported by an actuating system mounted on the support and configured to move the deflector wall along a predefined trajectory relative to the support between a retracted position and a deployed position.

BACKGROUND

The improved aerodynamics of a vehicle in particular allow a decrease in the aerodynamic drag and reduced energy consumption of the vehicle.

In particular, during the movement of the vehicle, the air flowing along the vehicle passes through the or each wheelhouse of the vehicle. This air, due to the rotating movement of the wheel, is made turbulent and deteriorates the aerodynamic performance of the vehicle by increasing the aerodynamic drag.

In order to limit the amount of air entering the or each wheelhouse, it is known to equip the vehicles with passive deflector systems comprising a deflector wall arranged upstream of the wheel of the vehicle and protruding from the lower face of the vehicle.

However, in the case of motor vehicles, these deflector walls have a reduced deployment height relative to the lower face of the vehicle, of the order of 50 millimeters for SUVs (Sport Utility Vehicles), so as to limit the risk of impact of the deflector wall on obstacles such as sidewalks, speed-bumps or rocks.

As a result, the air flows are not optimally deflected and the aerodynamic performance of the vehicle is not optimal. This then also results in a greater increase in the energy consumption of the vehicle.

It is possible to provide an active deflector system making it possible to vary the deployment height of the deflector wall. In such a system, when no obstacle is present, the deflector wall is controlled to increase its deployment height, and when an obstacle is detected, the deflector wall is controlled to decrease its deployment height. This solution is complicated to implement because it requires anticipating obstacles. Furthermore, this solution is costly in terms of energy. It is therefore not satisfactory.

SUMMARY

One of the aims of the invention is to propose a flow management device having an improved performance, that is to say allowing an improved deviation of the air flows, while being simple and inexpensive to implement.

To that end, the invention relates to a management device of the aforementioned type, wherein the deflector wall is mounted rotating relative to the support about an axis of rotation so as to be able to retract in case of contact of the deflector wall with an obstacle.

The air flow management device can also comprise one or several of the following features considered alone or according to any technically possible combination:
- the support is intended to be mounted on a part of the vehicle located upstream of a wheel of the vehicle.
- the air flow management device comprises a guide system for guiding the deflector wall along the predefined trajectory and in rotation, the guiding system comprising at least one guide groove and at least one guide pin movable in the at least one guide groove along the predefined trajectory between the retracted position and the deployed position, and rotatable in the guide groove about the axis of rotation, the at least one guide groove being arranged in one among the deflector wall and the support and the at least one guide pin being secured to the other among the deflector wall and the support.
- the actuating system comprises an actuator and a drive member of the deflector wall along the predefined trajectory, the actuator being configured to move the drive member axially.
- the air flow management device comprises an interface part connected on the one hand to the actuating system and on the other hand to the deflector wall and the interface part has a hole, the management device comprising at least one other guide pin connected to the deflector wall and the interface part, this other guide pin being mounted rotating in the hole about the axis of rotation.
- a passage hole of the actuating system is arranged in the deflector wall and, from the deployed position, the deflector wall is configured to have a maximal angle of rotation of the deflector wall about the axis of rotation, one edge of the passage hole delimiting the maximal angle of rotation of the deflector wall.
- the deployed position defines a stable equilibrium position of the deflector wall and the management device comprises at least one return member configured to constrain the deflector wall in the deployed position.
- the support forms a case delimiting a housing of the deflector wall and the deflector wall is movable along the predefined trajectory relative to the support between the retracted position in which the deflector wall is housed in the case and the deployed position in which the deflector wall is located at least partially outside the case.
- the support has a tight wall and the actuator is arranged above the wall.
- the actuating device is able to actuate the movement of the deflector wall from the retracted position to the deployed position when the speed of the vehicle is above a first threshold speed and to actuate the movement of the deflector wall from the deployed position to the retracted position when the speed of the vehicle is less than or equal to a second threshold speed separate from the first threshold speed.

The invention also relates to a vehicle comprising at least one air flow management device as previously defined, the management device being mounted on a part of the vehicle and upstream of a wheel of the vehicle.

BRIEF DESCRIPTION OF THE DRAWINGS

The invention will be better understood upon reading the following description, provided solely as an example and done in reference to the appended drawings, in which.

DETAILED DESCRIPTION

Figure 1:
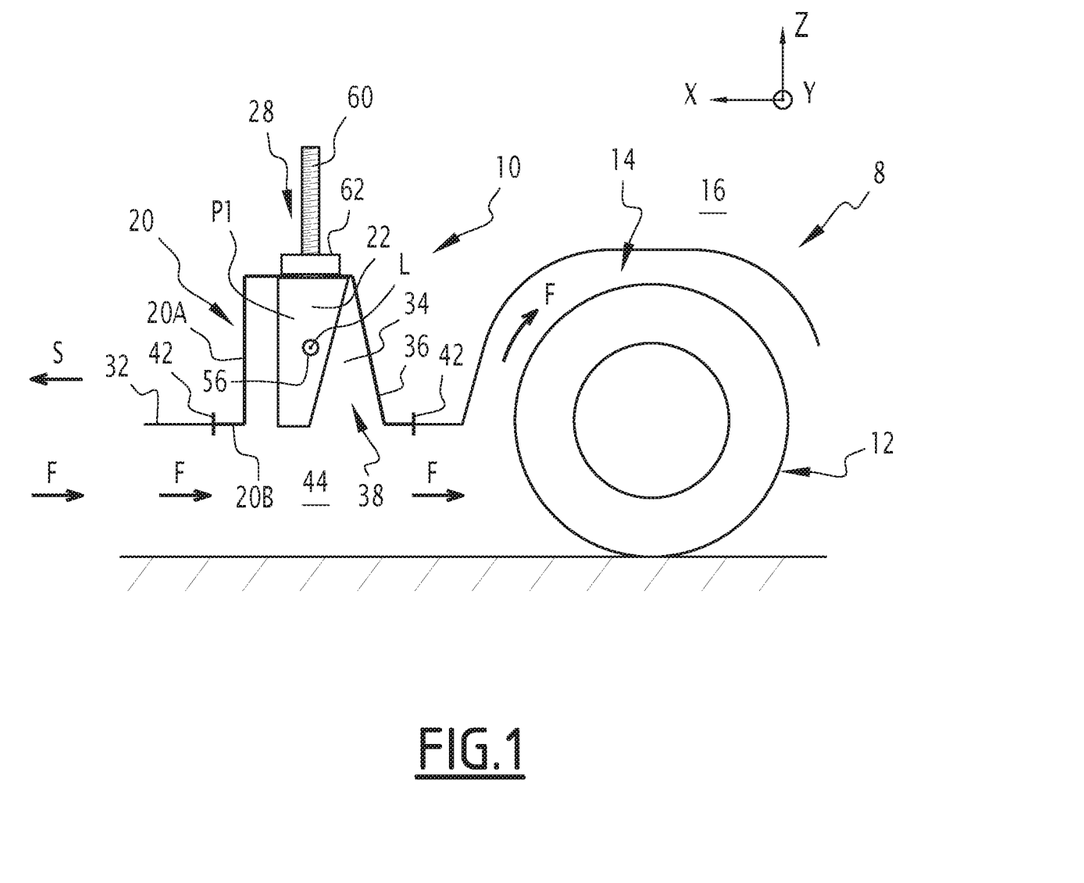
FIG. 1 is a schematic sectional view of an air flow management device according to an embodiment of the invention in which a deflector wall of the management device is in the retracted position.
Figure 2:
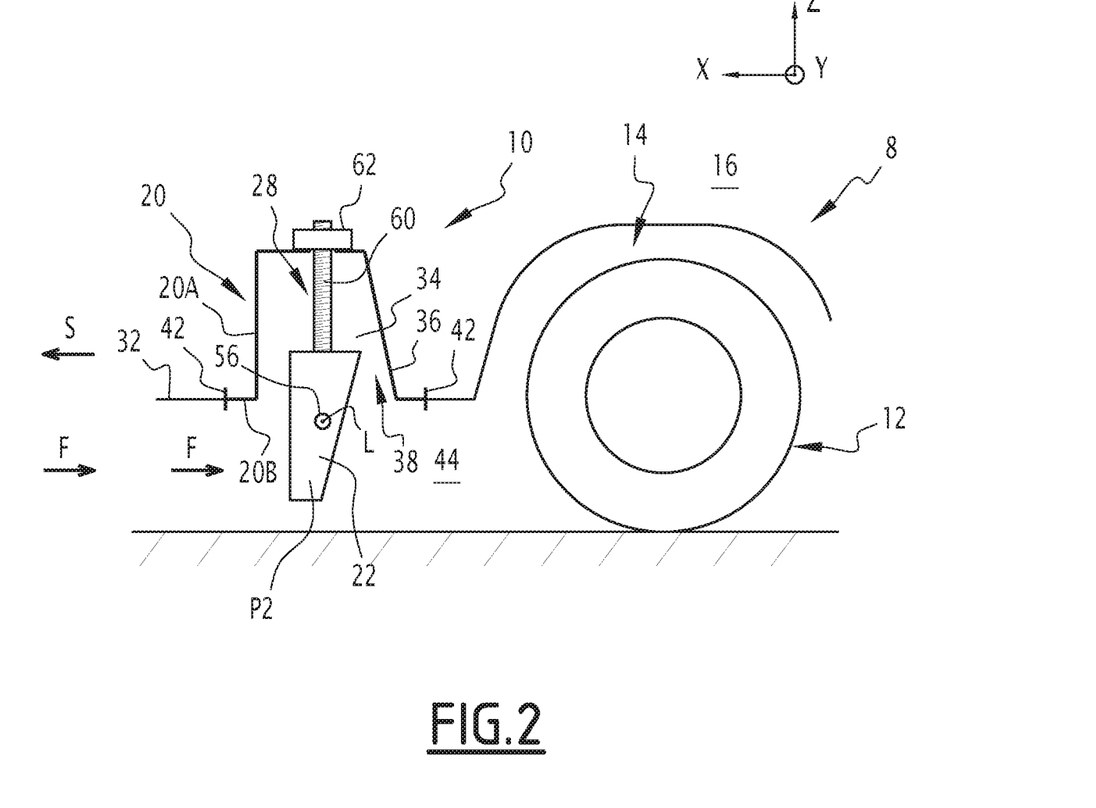
FIG. 2 is a schematic sectional illustration of the management device of FIG. 1 in which the deflector wall is in a deployed position.
Figure 3:
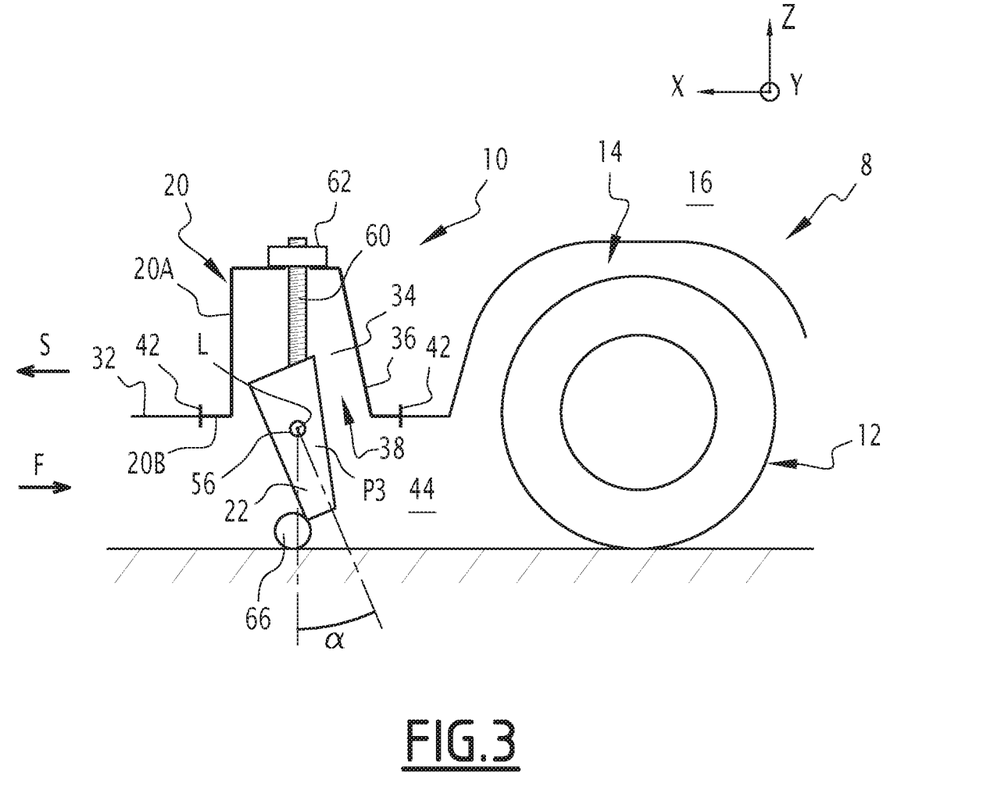
FIG. 3 is a schematic sectional illustration of the management device of FIG. 1 in which the deflector wall is in a rotation position.

A part of a vehicle 8 comprising an air flow management device 10 according to an embodiment of the invention is shown in FIGS. 1 to 3.

In the remainder of the disclosure, the orientation terms such as "longitudinal", "transverse", "vertical", "horizontal", "top", "bottom", "front" and "rear" are to be understood in reference to the usual orthogonal coordinate system of vehicles, comprising:
- a longitudinal axis X, oriented from back to front;
- a transverse axis Y, oriented from right to left; and
- a vertical axis Z, oriented from bottom to top.

Furthermore, the size of an element of the vehicle 8 or of the management device 10 measured along the direction of the longitudinal axis X is called "length", the size of an element of the vehicle 8 or of the management device 10 measured along the direction of the transverse axis Y is called "width", and the size of an element of the vehicle 8 or of the management device 10 measured along the direction of the vertical axis Z is called "height".

Furthermore, the vertical plane formed by the longitudinal axis X and the vertical axis Z is called "longitudinal plane" and the vertical plane formed by the transverse axis Y and the vertical axis Z is called "transverse plane".

The forward direction of the vehicle 8 is shown in FIGS. 1 to 3 by the arrow S. The direction of the air flow has a direction opposite the forward direction S of the vehicle 8 and is shown in FIGS. 1 to 3 by the arrow F.

In the remainder of the present disclosure, the terms "upstream" and "downstream" are defined relative to the direction of the air flows impacting the vehicle 8. Thus, a so-called "upstream" element is impacted by the air flows before a so-called "downstream" element.

The vehicle 8 is for example a motor vehicle.

In the case at hand, the vehicle 8 comprises a wheel 12 and a wheelhouse 14, the wheel 12 being received in the wheelhouse 14. The wheelhouse 14 is a housing delimited in the bodywork 16 of the vehicle 8 and receiving the wheel 12. The wheelhouse 14 partially surrounds the wheel 12. The wheelhouse 14 is sized to allow the vertical travel of the wheel 12 due to the presence of a suspension connecting the wheel 12 to the chassis of the vehicle, and, in the case of a steering wheel 12, its rotation about a substantially vertical axis.

The management device 10 makes it possible to deflect the air flows passing below the vehicle 8 on either side of the wheel 12 in order to limit the passage of the air flows in the wheelhouse 14.

The management device 10 comprises a support 20, at least one deflector wall 22, a guide system 24 of the or each deflector wall 22, at least one elastic return member 25, 26, an actuating system 28 of the or each deflector wall 22 and an interface part 30.

The support 20 is fixed to a part 32 of the vehicle 8 located in front of the wheel 12.

As an illustration, the vehicle 8 part 32 is a deflector located below the engine of the vehicle 8. The surface of the vehicle part 32 opposite the ground is called lower surface of the vehicle 8.

In a variant, the front part is a lower bumper deflector.

The support 20 forms a case delimiting a housing 34 able to receive the deflector wall 22.

For example, the case has the shape of a bell.

In particular, in the present exemplary embodiment, the support 20 comprises a first part 20A and a second part 20B.

The first part 20A of the support 20 comprises a wall 36 delimiting the housing 34.

Furthermore, the wall 36 has an inlet opening 38 into the housing 34. The inlet opening 38 emerges downwardly. Thus, the housing 34 emerges by the inlet opening 38 onto the lower surface of the vehicle 8.

The wall 36 is for example obtained by molding.

The wall 36 has undercut angles allowing direct stripping of the wall 36 from a mold used for the molding.

Figure 5:
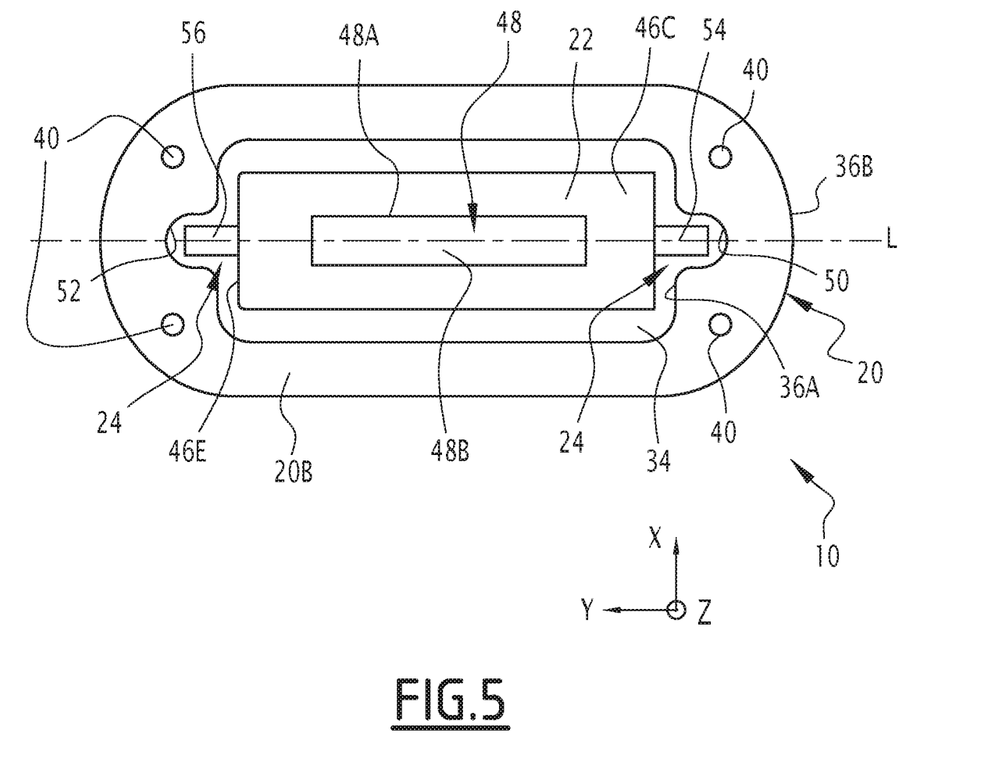
FIG. 5 is a schematic sectional illustration of a deflector wall of the management device of FIG. 1.

The wall 36 has an inner face 36A and an outer face 36B (visible in FIG. 5). The inner face 36A is oriented toward the ground on which the vehicle 8 rests, while the outer face 36B is opposite the inner face 36A.

As an example, the inner face 36A and the outer face 36B of the wall 36 have a pyramidal shape in section in the longitudinal plane. In a variant, the inner face 36A and the outer face 36B have a rectangular shape in the longitudinal plane.

Furthermore, the inner face 36A has a rectangular shape in section in the transverse plane.

For example, in the section plane delimited by the longitudinal axis X and the transverse axis Y, that is to say perpendicular to the vertical axis Z, the wall 36 has a closed contour. In particular, the inner face 36A and the outer face 36B each have a closed contour.

The second support part 20B forms a flange ring for fastening the support 20 on the vehicle 8 part 32.

As an example, the second part 20B has passage holes 40 for screws 42 for fastening the support 20 on the vehicle 8 part 32.

In the described example, the support 20 is fixed at a hole arranged in the vehicle 8 part 32 and which emerges in a passage 44 arranged below the vehicle 8 communicating with the wheelhouse 14. Furthermore, the inlet opening 38 into the housing 34 coincides with the hole of the vehicle 8 part 32.

For example, the wall 36 is made from a polymer.

In the present exemplary embodiment, the management device 10 comprises a single deflector wall 22.

In a variant, the management device 10 comprises at least two deflector walls 22.

The deflector wall 22 is movable along a predefined trajectory relative to the support 20 between a retracted position P1 (visible in FIG. 1) and a deployed position P2 (visible in FIG. 2).

In particular, the deflector wall 22 is supported by the actuating system 28 mounted on the support 20 and configured to move the deflector wall 22 along a predefined trajectory relative to the support 20 between a retracted position P1 and a deployed position P2.

The deflector wall 22 is for example translatable relative to the support 20, along the predefined trajectory, between the retracted position P1 and the deployed position P2.

Thus, the movement of the deflector wall 22 between the retracted position P1 and the deployed position P2 has at least one component of translation. For example, between the retracted position P1 and the deployed position P2, the deflector wall 22 may also have a component of rotation.

For example, the predefined trajectory is rectilinear along a direction substantially parallel to the vertical axis Z.

"Substantially parallel to the vertical axis Z" means that the direction of the predefined trajectory can define a non-zero angle with the vertical axis Z, for example an angle of less than or equal to 5 degrees. Thus, the direction of the predefined trajectory can have a component along a direction parallel to the longitudinal axis X and/or a component along a direction parallel to the transverse axis Y.

In particular, in the retracted position P1, the deflector wall 22 is housed in the housing 34 of the support 20. In other words, in the retracted position P1, the deflector wall 22 is withdrawn in the housing 34. The retracted position P1 forms a stable equilibrium position of the deflector wall 22.

"Stable equilibrium position" means that after a disturbance that has moved the deflector wall 22 away from this position, the deflector wall 22 spontaneously returns to this stable position.

Furthermore, in the deployed position P2, the deflector wall 22 is located at least partially outside the housing 34 of the support 20. In other words, in the deployed position P2, the deflector wall 22 extends outside the housing 34 protruding relative to the lower surface of the vehicle 8.

Thus, in the deployed position P2, the deflector wall 22 protrudes downward relative to the part 32 of the vehicle 8 on which the management device 10 is mounted.

The deployed position P2 also forms a stable position of the deflector wall 22.

Furthermore, the deflector wall 22 is mounted rotatably relative to the support 20 about an axis of rotation L. The axis of rotation L is substantially parallel to the transverse axis Y.

The deflector wall 22 is able to pivot from the deployed position P2 into rotation positions P3 about the axis of rotation L. One of the rotation positions P3 is shown in FIG. 3.

Each rotation position P3 is separate from the deployed position P2. In each rotation position P3, the deflector wall 22 forms a non-zero angle α with the deflector wall 22 in the deployed position P2, hereinafter called angle of rotation α. Each rotation position P3 is characterized by an angle of rotation α.

One such angle of rotation α is shown in FIG. 3.

Furthermore, in this embodiment, each rotation position P3 corresponds to an unstable equilibrium position of the deflector wall 22.

"Unstable equilibrium position" means that after a disturbance that has moved the deflector wall 22 away from this position, the deflector wall 22 does not spontaneously return to the unstable position.

At least one maximal rotation position P3 of the deflector wall 22 is defined. In the maximal rotation position P3, the deflector wall 22 is pivoted relative to the deployed position P2, by a maximal angle of rotation $\alpha_{max}$. More specifically, the maximal angle of rotation $\alpha_{max}$ is defined as the maximal angle that the deflector wall 22 can assume in the rotation position P3 relative to the deployed position P2.

Figure 4:
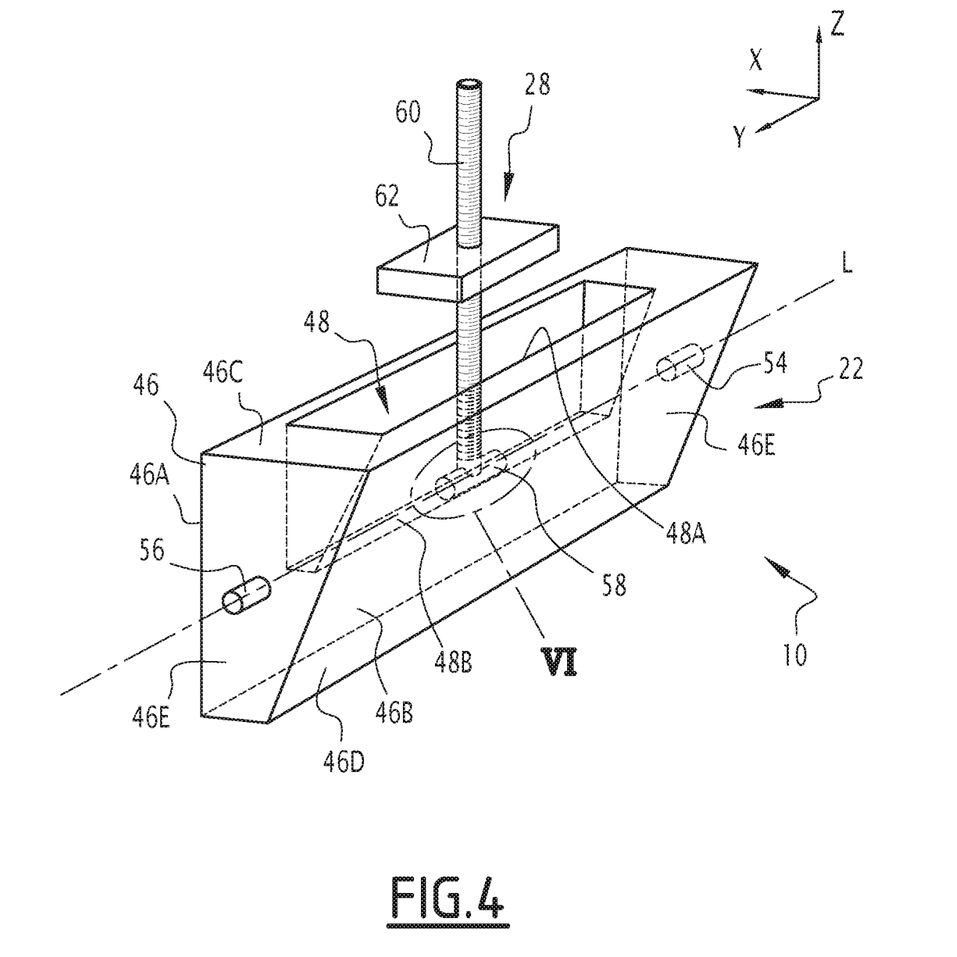
FIG. 4 is a schematic perspective illustration of a deflector wall and an actuating device of the deflector wall of the management device of FIG. 1.

The deflector wall 22 is described in reference to FIG. 4, which shows the deflector wall 22 in the retracted position P1. Furthermore, in this figure, the support 20 is not shown.

The deflector wall 22 comprises a body 46.

The body 46 has a front wall 46A, a rear wall 46B, an upper wall 46C, a lower wall 46D and two side walls 46E connecting the upper 46C, lower 46D, front 46A and rear 46B walls to one another.

The front wall 46A for example extends in the transverse plane. The rear wall 46B is in turn inclined relative to the transverse plane.

The body 46 has a pyramidal shape in section in a longitudinal section plane, the large base being located above the small base.

In a variant, the body 46 has a different shape.

In the present example, the width of the body 46 is much greater than the length of the body 46. The width of the body 46 corresponds to the width of the large base of the body 46, that is to say the upper wall 46C in the case at hand, and the length of the body corresponds to the length of the large base of the body 46.

The width and the length of the body 46 depend on the type of vehicle 8.

For example, the width of the body 46 is inclusively between 100 mm (millimeters) and 600 mm.

For example, the length of the body 46 is inclusively between 20 mm and 100 mm.

Furthermore, the height of the body 46 depends on the type of vehicle 8 and in particular the ground clearance of the vehicle 8 below the part 32 of the vehicle 8 bearing the management device 10. The ground clearance below the part 32 of the vehicle 8 is the distance between the ground and the lowermost part 32 of the vehicle 8.

For example, the height of the body 46 of the deflector wall 22 is inclusively between 50 mm and 250 mm.

A passage hole 48 of the actuating system is arranged in the body 46 and emerges in the upper wall 46C of the body 46. The passage hole 48 has an edge 48A belonging to the upper wall of 46C of the body and a bottom 48B.

The body 46 is for example made from polymer.

In the retracted position P1 of the deflector wall 22, the body 46 of the deflector wall 22 is housed in the housing 34 of the support 20. In particular, in the present exemplary embodiment, the lower wall 46D of the body 46 is located in a same plane as the plane in which the edge of the orifice 38 of the first support 20 part 20A extends.

In the retracted position P1, the deflector wall 22 is not able to move in the housing 34.

In particular, the first part 20A of the support 20 has a shape adapted to the shape of the body 46 of the deflector wall 22. In particular, in the retracted position P1, the support 20 prevents the deflector wall 22 from pivoting.

As shown in FIG. 2, in the deployed position P2 of the deflector wall 22, at least part of the body 46 of the deflector wall 22 extends outside the housing 34 formed by the support 20.

Advantageously, the height measured between the lower wall 46D of the deflector wall 22 and the ground is inclusively between 10 mm and 100 mm.

The guide system 24 is able to guide the deflector wall 22 along the predefined trajectory.

In reference to FIGS. 4 and 5, the guide system 24 comprises at least one guide groove and at least one guide pin movable in the guide groove along the predefined trajectory between the retracted position P1 and the deployed position P2 and mounted rotating in the guide groove about the axis of rotation L, the guide groove being arranged in one among the deflector wall 22 and the support 20 and the pin being secured to the other among the deflector wall 22 and the support 20.

In the present exemplary embodiment, the guide system 24 comprises two guide grooves 50, 52, a first guide pin 54, a second guide pin 56 for guiding and a third guide pin 58.

Each guide groove 50, 52 is arranged in the inner face 36B of the first part 20A of the support 20. Each guide groove 50, 52 extends along the predefined trajectory. Each guide groove 50, 52 for example extends substantially parallel to the vertical axis Z along the predefined rectilinear trajectory. Furthermore, the guide grooves 50, 52 are arranged facing one another substantially along the direction of the transverse axis Y.

"Substantially parallel to the vertical axis Z" means that each guide groove 50, 52 can have a non-zero angle relative to the vertical axis Z, for example an angle of less than or equal to 5 degrees. Thus, each guide groove 50, 52 can have a component along a direction parallel to the longitudinal axis X and/or a component along a direction parallel to the transverse axis Y.

The first and second guide pins 54, 56 are secured to side walls 46E of the deflector wall 22. In the present exemplary embodiment, the guide pins 54, 56 are coaxial and extend along the axis of rotation L.

The first and second guide pins 54, 56 each cooperate with a respective guide groove 50, 52. Each guide groove 50, 52 is able to guide the movement of each of the first and second guide pins 54, 56 between the retracted position P1 and the deployed position P2 of the deflector wall 22 along the predefined trajectory.

Furthermore, the first and second guide pins 54, 56 are each mounted pivoting about the axis of rotation L in the corresponding guide groove 50, 52. Thus, the first and second guide pins 54, 56 form pivots of the deflector wall 22 about the axis of rotation L.

The first and second guide pins 54, 56 for example each have a cylindrical shape, centered on the axis of rotation L.

As an example, the first and second guide pins 54, 56 are attached on the deflector wall 22. In a variant, the first and second guide pins 54, 56 are integral with the deflector wall 22.

The third guide pin 58 is secured to the deflector wall 22 and is, for example, arranged between the first and second guide pins 54, 56 along the axis of rotation L. In other words, the first, second and third guide pins 50, 52, 58 are aligned on the axis of rotation L.

In particular, the third guide pin 58 is arranged in the bottom 48B of the passage hole 48 arranged in the body 46 of the deflector wall 22. The third pin 58 can be arranged in a position other than the bottom 48B of the passage hole 48. In particular, the third pin 58 can be arranged for example between the bottom 48B of the passage hole 48 and the upper wall 46C of the body 46 of the deflector wall 22, as long as the third pin 58 is aligned with the first and second pins 50, 52 on the axis of rotation L.

The third guide pin 58 for example has a cylindrical shape centered on the axis of rotation L.

Figure 6:
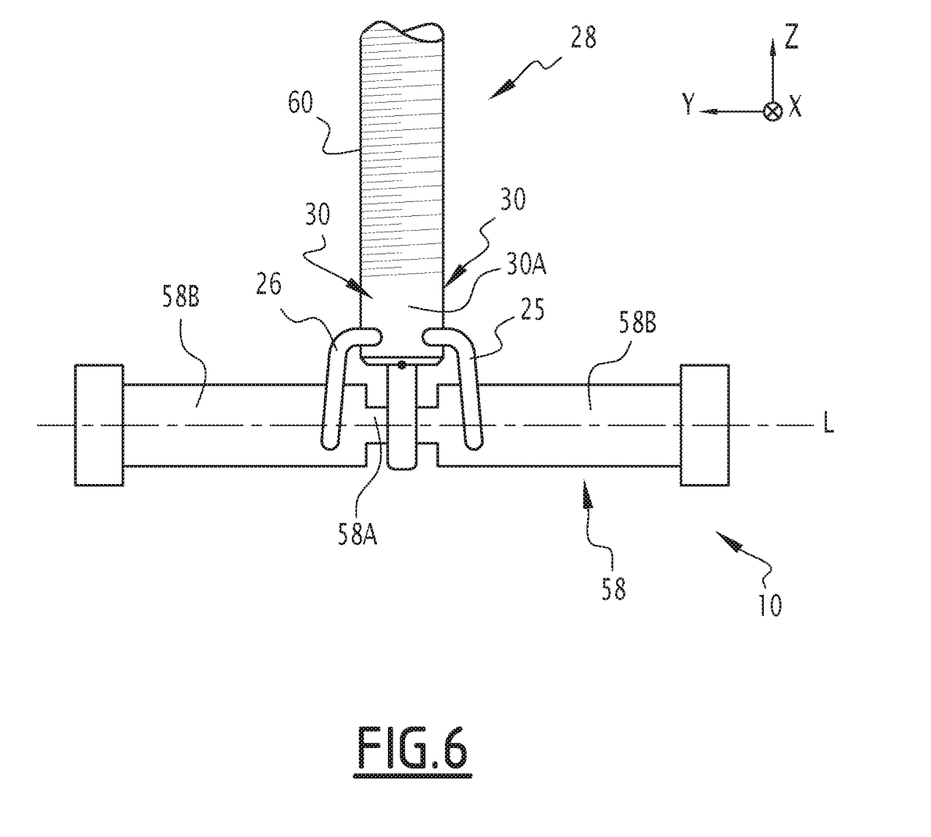
FIG. 6 is a detailed front illustration of part of a guide system and an actuating system of a deflector wall of the device of FIG. 1.

In reference to FIG. 6, the third guide pin 58 has a central portion 58A and side portions 58B located on either side of the central portion 58A along the transverse direction Y. The central portion 58A for example has a diameter strictly smaller than the diameter of each side portion 58B.

As an example, the third guide pin 58 is attached on the deflector wall 22. In a variant, the third guide pin 58 is integral with the deflector wall 22.

The management device 10 for example comprises two return members 25, 26 configured to return the deflector wall 22 to the deployed position P2.

The return members 25, 26 are mounted between the third guide pin 58 and the interface part 30. In particular, each return member 25, 26 is secured on the one hand to the third guide pin 58 and on the other hand to the interface part 30.

For example, each return member 25, 26 is an elastic return member, such as a torsion spring. In this configuration, the return members 25, 26 contribute to returning the deflector wall 22 from the rotation position P3 to the deployed position P2.

In the present exemplary embodiment, one of the return members 24 is able to pivot the deflector wall 22 in a first direction of rotation about the axis of rotation L in order to return the deflector wall 22 to the deployed position P2 and the other return member 26 is able to pivot the deflector wall 22 in a second direction of rotation about the axis of rotation L opposite the first direction in order to return the deflector wall 22 to the deployed position P2.

In a variant, the two return members 25, 26 are able to pivot the deflector wall 22 about the axis of rotation in a same direction in order to return the deflector wall 22 to the deployed position P2.

Also in a variant, the management device 10 comprises a single return member.

The actuating system 28 is configured to move the deflector wall 22 in a substantially vertical direction relative to the support 20, so as to move it between the retracted position P1 and the deployed position P2.

The actuating system 28 for example comprises a drive member 60 and an actuator 62.

The drive member 60 is configured to move the deflector wall 22 along an axis substantially parallel to the vertical axis Z.

Thus, the drive member 60 is connected on the one hand to the actuator 62 and on the other hand to the third guide pin 58 secured to the deflector wall 22.

For example, the drive member 60 is a worm.

In the case at hand, the worm 60 is blocked in rotation about the vertical axis Z.

As an illustration, as visible in FIG. 4, the worm 60 passes through the support 20 and is connected on the one hand to the actuator 62 and on the other hand to the guide pin 58 secured to the deflector wall 22 by means of the connector part 30.

Furthermore, part of the worm 60 is inserted into the passage wall 48 arranged in the body of the deflector wall 22.

In the present exemplary embodiment, the edge 48A of the hole 48 delimits the maximal angle of rotation $\alpha_{max}$ of the deflector wall 22.

Furthermore, the maximal angle of rotation $\alpha_{max}$ depends on at least one of the parameters included in the following list:
  the length of the passage hole 48,
  the shape of the passage hole 48,
  the position of the axis of rotation L along the vertical axis Z relative to the body 46 of the deflector wall 22, and
  the height of the deflector wall 22.

The actuator 62 is configured to move the worm 60 axially. The actuator 62 has a fluted orifice (not shown).

The worm 60 for example integrates an interface part (not shown) having a geometry compatible with the geometry of the fluting of the orifice of the actuator 62 allowing the axial movement of said worm 60.

The actuator 62 is arranged above the support 20 and fixed to the support 20.

The actuating system 28 is able to actuate the translation of the deflector wall 22 from the retracted position P1 to the deployed position P2 when the speed of the vehicle 8 exceeds a first threshold speed V1. For example, the first threshold speed V1 is equal to 80 km/h.

In a variant (not shown), the actuating system 28 is a pinion-rack system. Thus, the actuating system 28 includes a rack as translational drive member 60 and the actuator 62 integrates a toothed wheel that is rotatable and able to move the rack axially.

Furthermore, the actuating system 28 is able to actuate the translation of the deflector wall 20 from the deployed position P2 to the retracted position P1 when the speed of the vehicle 8 is less than or equal to a second speed threshold V2 separate from the first speed threshold V1. For example, the second threshold speed V2 is equal to 60 km/h.

The interface part 30 is located at the lower end of the worm 60 and is connected to the third guide pin 58. In particular, the interface part 30 has a through hole in which the third guide pin 58 is inserted.

The operation of the management device 10 is described hereinafter.

From an initial retracted position P1 of the deflector wall 22 (FIG. 1), when the speed of the vehicle 8 reaches the first speed V1, the actuating system 28 is activated and actuates the movement of the deflector wall 22 along the predefined trajectory in the deployed position P2 (FIG. 2). In particular, when the actuating system 28 is activated, the worm 60 is translated along an axis substantially parallel to the vertical axis Z, and translates the deflector wall 22 borne by the worm 60 via the third guide pin 58. Furthermore, each of the first and second guide pins 54, 56 is also translated in a respective guide groove 50, 52 along a direction substantially parallel to the vertical axis Z.

As shown in FIG. 3, when the vehicle 8 passes over an obstacle 66 and when the deflector wall comes into contact or collides with an obstacle 66 present on the ground, the deflector wall 22 pivots about the axis of rotation L from the deployed position P2 into a plurality of rotation positions P3 (one of which is visible in FIG. 3). This allows the deflector wall 22 to retract by pivoting in order to pass the obstacle 66 without being damaged.

The described management device 10 is a management device 10 having improved performance levels, that is to say allowing an optimal deflection of the air flows on either side of the or each wheel 8 of the vehicle.

Indeed, the management device 10 makes it possible to cross obstacles 66 from the deployed position P2 of the deflector wall 22. Indeed, in contact with the obstacle 66, the deflector wall 22 pivots about the axis of rotation L and makes it possible to cross the obstacle 66 without having to position the deflector wall 22 in the retracted position P1. The management device 10 therefore makes it possible to physically safeguard the entire deflector wall 22 in case of contact with an obstacle 66 present on the ground.

The management device 10 therefore prevents an untimely passage of the deflector wall 22 between the deployed P2 and retracted P1 positions.

Furthermore, the management device 10 allows a passage of the deflector wall 22 into each rotation position P3 passively. As a result, the management device 10 saves energy.

Furthermore, the management device 10 is structurally simple. It is also easy to implement.

Furthermore, the management device 10 can adapt easily to the different types of vehicles 8 by for example adapting the dimensions of the body 46 of the deflector wall 22, the dimensions of the passage hole 48 arranged in the body 46 of the deflector wall 22 in which the actuating system 28 passes and/or the position of the axis of rotation L relative to the deflector wall 22.

Figure 7:
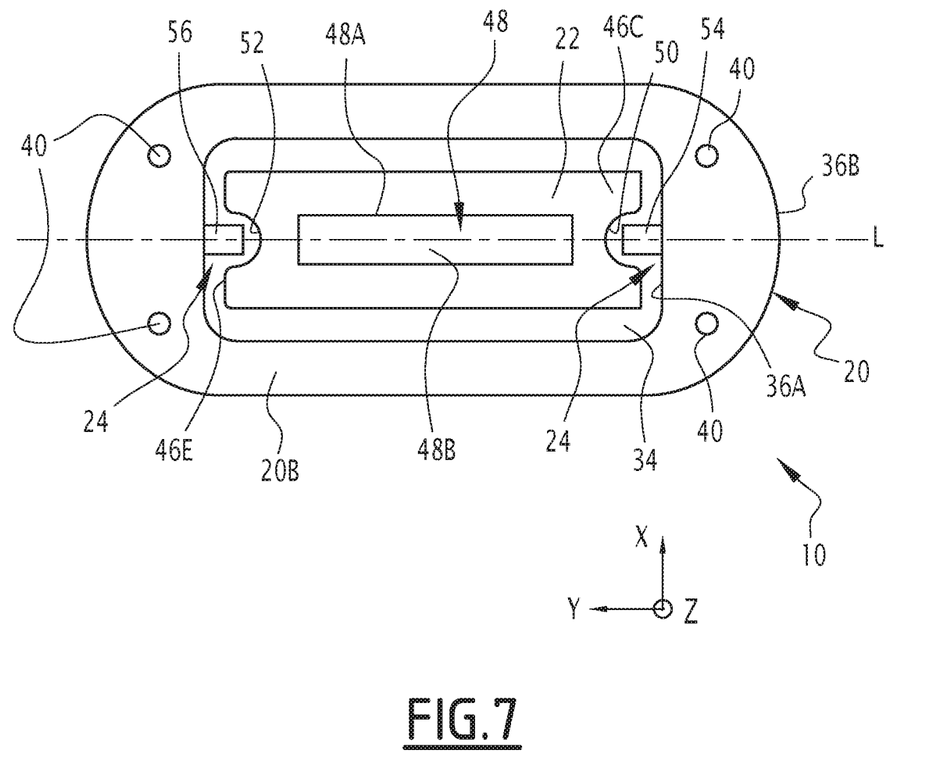
FIG. 7 shows a variant of a guide system of the management device of FIG. 1.

A variant of the guide system 24 is shown in FIG. 7. In this variant, the first and second guide pins 54, 56 are mounted on the inner face 36A of the wall 36 of the support 20 and each slide in a guide groove 54, 56 provided in the deflector wall 22.

Another embodiment of the management device 10 (not shown) is now described, only in terms of its differences relative to the embodiment of FIGS. 1 to 7.

In this embodiment, each return member 25, 26 comprises a dog or a ratchet wheel.

The return of the deflector wall 22 from the rotation position P3 is done when the deflector wall 22 returns to the retracted position P1, before returning to the deployed position P2. In this case, the shape of the deflector wall 22 and the shape of the support 36 are suitable for allowing the deflector wall 22 to return to the retracted position P1 when the deflector wall 22 is in the rotation position P3.

In this case, each rotation position P3 forms a stable equilibrium position.

Figure 8:
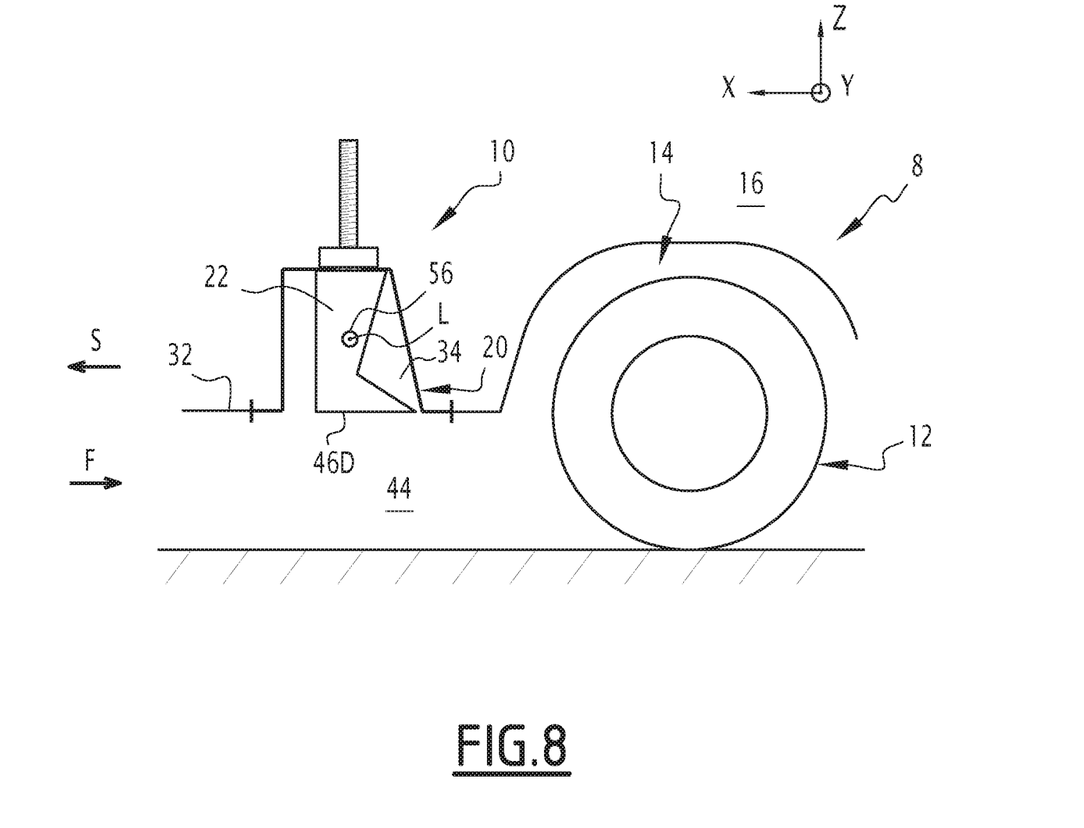
FIG. 8 is a schematic sectional view of an air flow management device according to the invention comprising a deflector wall according to another embodiment.

A variant of the deflector wall 22 is shown in FIG. 8 and described only in terms of how it differs from the deflector wall 22 illustrated in FIGS. 1 to 7.

The lower wall 46D of the body 46 of the deflector wall 22 for example has a length and/or a width such that the lower wall 46D limits the dimensions of the inlet orifice 38 in the housing 34 when the deflector wall 22 is in the retracted position P1.

As an example, the lower wall 46D of the body 46 has a length and a width that are respectively adapted to the length and the width of the inlet opening 38. In this case, the deflector wall 22 closes off the inlet orifice 38 in the retracted position P1.

The described management device 10 can indifferently be associated with a front wheel 12 or rear wheel of the vehicle 8. Furthermore, a management device 20 can be associated with each front wheel 12 and/or with each rear wheel of the vehicle 8.

The invention claimed is:

1. An air flow management device for a vehicle, comprising:
   a support,
   at least one deflector wall supported by an actuating system mounted on the support and configured to move the deflector wall along a predefined trajectory relative to the support between a retracted position and a deployed position, wherein the deflector wall is mounted for rotation relative to the support about an axis of rotation to permit retraction in case of contact of the deflector wall with an obstacle, and
   a guide system for guiding the deflector wall along the predefined trajectory and in rotation, the guide system comprising at least one guide groove and at least one guide pin, the at least one guide pin being:

movable in the at least one guide groove along the predefined trajectory between the retracted position and the deployed position, and rotatable in the at least one guide groove about the axis of rotation, the at least one guide groove being arranged in one of: the deflector wall and the support, and the at least one guide pin being secured to the other one of: the deflector wall and the support.

2. The management device according to claim 1, wherein the actuating system comprises an actuator and a drive member of the deflector wall along the predefined trajectory, the actuator being configured to move the drive member axially.

3. The management device according to claim 2, wherein the support has a watertight wall and the actuator is arranged above the wall.

4. The management device according to claim 1, comprising an interface part connected at one end to the actuating system and at another end to the deflector wall and wherein the interface part has a hole, the management device comprising at least one other guide pin connected to the deflector wall and the interface part, this other guide pin being mounted rotating in the hole about the axis of rotation.

5. The management device according to claim 1, wherein a passage hole of the actuating system is arranged in the deflector wall and, from the deployed position, the deflector wall is configured to have a maximal angle of rotation of the deflector wall about the axis of rotation, one edge of the passage hole delimiting the maximal angle of rotation of the deflector wall.

6. The management device according to claim 1, wherein the deployed position defines a stable equilibrium position of the deflector wall and wherein the management device comprises at least one return member configured to constrain the deflector wall in the deployed position.

7. The management device according to claim 1, wherein the support forms a case delimiting a housing of the deflector wall and the deflector wall is movable along the predefined trajectory relative to the support between the retracted position in which the deflector wall is housed in the case and the deployed position in which the deflector wall is located at least partially outside the case.

8. The management device according to claim 1, wherein the actuating device is able to actuate the movement of the deflector wall from the retracted position to the deployed position when the speed of the vehicle is above a first threshold speed and to actuate the movement of the deflector wall from the deployed position to the retracted position when the speed of the vehicle is less than or equal to a second threshold speed separate from the first threshold speed.

9. A vehicle comprising at least one air flow management device according to claim 1, the management device being mounted on a part of the vehicle and upstream of a wheel of the vehicle.

10. An air flow management device for a vehicle, comprising:

a support, at least one deflector wall supported by an actuating system mounted on the support and configured to move the deflector wall along a predefined trajectory relative to the support between a retracted position and a deployed position, wherein the deflector wall is mounted for rotation relative to the support about an axis of rotation to permit retraction in case of contact of the deflector wall with an obstacle, wherein a passage hole of the actuating system is arranged in the deflector wall and, from the deployed position, the deflector wall is configured to have a maximal angle of rotation of the deflector wall about the axis of rotation, one edge of the passage hole delimiting the maximal angle of rotation of the deflector wall.

11. The management device according to claim 10, wherein the actuating system comprises an actuator and a drive member of the deflector wall along the predefined trajectory, the actuator being configured to move the drive member axially.

12. The management device according to claim 11, wherein the support has a watertight wall and the actuator is arranged above the wall.

13. The management device according to claim 10, comprising an interface part connected at one end to the actuating system and at another end to the deflector wall and wherein the interface part has a hole, the management device comprising at least one other guide pin connected to the deflector wall and the interface part, this other guide pin being mounted rotating in the hole about the axis of rotation.

14. The management device according to claim 10, wherein the deployed position defines a stable equilibrium position of the deflector wall and wherein the management device comprises at least one return member configured to constrain the deflector wall in the deployed position.

15. The management device according to claim 10, wherein the support forms a case delimiting a housing of the deflector wall and the deflector wall is movable along the predefined trajectory relative to the support between the retracted position in which the deflector wall is housed in the case and the deployed position in which the deflector wall is located at least partially outside the case.

16. The management device according to claim 10, wherein the actuating device is able to actuate the movement of the deflector wall from the retracted position to the deployed position when the speed of the vehicle is above a first threshold speed and to actuate the movement of the deflector wall from the deployed position to the retracted position when the speed of the vehicle is less than or equal to a second threshold speed separate from the first threshold speed.

17. A vehicle comprising at least one air flow management device according to claim 10, the management device being mounted on a part of the vehicle and upstream of a wheel of the vehicle.

* * * * *